(12) United States Patent
Ryken

(10) Patent No.: US 6,422,254 B1
(45) Date of Patent: Jul. 23, 2002

(54) HYDRAULIC CONTROL COLD START NEUTRAL VALVE

(75) Inventor: James D. Ryken, Roland, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/672,666

(22) Filed: Jan. 8, 2001

(51) Int. Cl.⁷ ............................................. F16K 11/065
(52) U.S. Cl. .................... 137/1; 137/625.6; 137/625.69
(58) Field of Search ..................... 137/1, 625.2, 625.6, 137/625.64, 625.66, 625.69

(56) References Cited

U.S. PATENT DOCUMENTS

| 3,528,454 A | * | 9/1970 | Lewis | 137/625.69 |
| 4,354,527 A | * | 10/1982 | McMillan | 137/625.6 |
| 4,355,506 A | | 10/1982 | Leonard | 60/389 |
| 4,730,543 A | * | 3/1988 | Holmes | 137/625.6 |
| 4,759,185 A | | 7/1988 | McConnell et al. | 60/444 |
| 4,777,797 A | * | 10/1988 | Mucheyer | 60/329 |
| 5,184,466 A | * | 2/1993 | Schniederjan et al. | 60/448 |
| 5,186,446 A | | 2/1993 | Schniederjan et al. | 60/448 |
| 5,313,983 A | * | 5/1994 | Rost et al. | 137/625.6 |
| 5,473,895 A | | 12/1995 | Bausenhart et al. | 60/448 |
| 5,560,203 A | | 10/1996 | Pollman | 60/327 |
| 5,678,462 A | | 10/1997 | Bausenhart et al. | 74/731.1 |
| 5,933,795 A | | 8/1999 | Schottler et al. | 702/145 |

* cited by examiner

Primary Examiner—Stephen M. Hepperle
(74) Attorney, Agent, or Firm—Zarley, McKee, Thomte, Voorhees & Sease, P.L.C.

(57) ABSTRACT

A hydraulic neutral cold start control valve for a variable displacement hydraulic unit includes a housing with a spool bore and an intersecting signal pressure passage therein. A spool is disposed in the bore and is mechanically biased to a closed or neutral position of the valve by a pair of opposing springs. A plunger is associated with one of the springs and has a surface that usually sealingly contacts one end of the spool but extends radially therebeyond such that it is in fluid communication with the signal pressure passage. When the signal pressure exceeds a threshold value, the pressure forces the plunger to separate from the end of the spool. Then the movement of the spool becomes proportional to the signal pressure, which is desirable for normal operation and control of the hydraulic unit. If the vehicle powering the hydraulic unit is shut off or the signal pressure is interrupted such that it drops below the threshold value, the opposing springs resume control and move the spool to a neutral position. This ensures that low torque will be required to restart the vehicle, even under cold oil conditions.

11 Claims, 6 Drawing Sheets

US 6,422,254 B1

HYDRAULIC CONTROL COLD START NEUTRAL VALVE

BACKGROUND OF THE INVENTION

The present invention relates to the field of hydrostatic transmissions for propelling vehicles. More particularly, this invention relates to a hydraulic control cold start neutral valve for insuring that a variable displacement hydraulic unit is positively and automatically forced to a neutral position when the vehicle is shut off or the command signal is withdrawn or decreased below a predetermined threshold level. The invention further insures that the unit is in a neutral position for start up so as to reduce the amount of starter torque required.

Vehicles typically have a limited amount of starter torque available. With hydrostatic units, torque requirements increase dramatically when the oil used in the unit is cold. The oil is more viscous and difficult to move at low temperatures. Placing the yoke or swashplate of the unit near to or in a neutral position during starting of the vehicle reduces the starting torque required. Furthermore, insuring that the hydraulic unit is automatically and positively forced into a neutral condition at shut off and start up may also be desirable from a safety standpoint.

Thus, a primary objective of the present invention is the provision of an automatic hydraulic control cold start neutral valve.

Another objective of this invention is the provision of a valve that is inexpensive to construct and easy to incorporate in a variety of servo controlled hydraulic units.

Another objective of this invention is the provision of a valve that is durable and reliable in use.

These and other objectives will be apparent from the drawings, as well as from the description and claims that follow.

SUMMARY OF THE INVENTION

The present invention relates to a hydraulic neutral cold start control valve for a variable displacement hydraulic unit. The valve includes a housing with a spool bore and an intersecting signal pressure passage therein. A spool is disposed in the bore and is mechanically biased to a closed or neutral position of the valve by a pair of opposing springs. A plunger is associated with one of the springs and has a surface that usually sealingly contacts one end of the spool but extends radially therebeyond such that it is in fluid communication with the signal pressure passage.

When the signal pressure exceeds a threshold value, the pressure forces the plunger to separate from the end of the spool. Then the movement of the spool becomes proportional to the signal pressure, which is desirable for normal operation and control of the hydraulic unit. If the vehicle powering the hydraulic unit is shut off or the signal pressure is interrupted such that it drops below the threshold value, the opposing springs resume control and move the spool to a neutral position. This ensures that low torque will be required to restart the vehicle, even under cold oil conditions.

This disclosure includes two embodiments of the valve. One embodiment is configured as a three-position, four-port valve and the other embodiment is configured as a two-position, three-port valve. The cold start neutral valve of this invention is shown in one possible application with one of the spool positioning springs being carried by a feedback member that engages the yoke of a bent axis hydraulic unit.

DETAILED DESCRIPTION OF THE PREFERRED EMBODIMENT(S)

Figure 1:
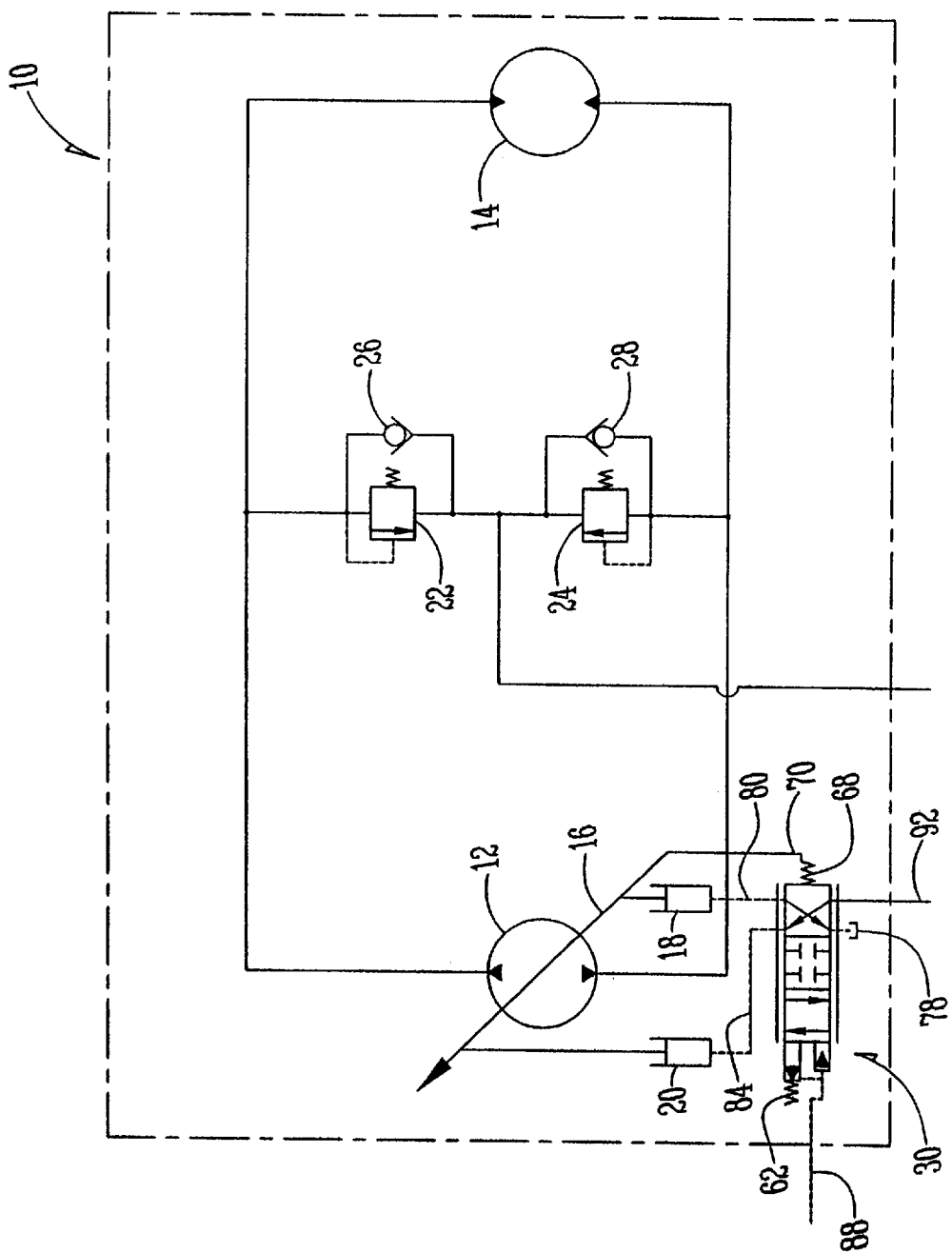
FIG. 1 is a hydraulic schematic of a circuit including one embodiment of the cold start neutral valve of the present invention.

FIG. 1 shows a hydraulic transmission 10 that includes a variable displacement hydraulic pump 12 connected in a closed circuit loop to a hydraulic motor 14. The variable displacement pump 12 has a swashplate or yoke 16 whose angular position determines the fluid displacement of the pump 12 in a conventional manner. First and second servos 18, 20 drivingly connect to the yoke 16 on opposing sides of its axis of rotation so as to swing the yoke. The servos 18, 20 are also referred to as the outboard servo A and the inboard servo B in the preferred embodiments shown and described herein. Conventional charge relief valves 22, 24 and check valves 26, 28 are also included in the circuit for the transmission 10.

Figure 2:
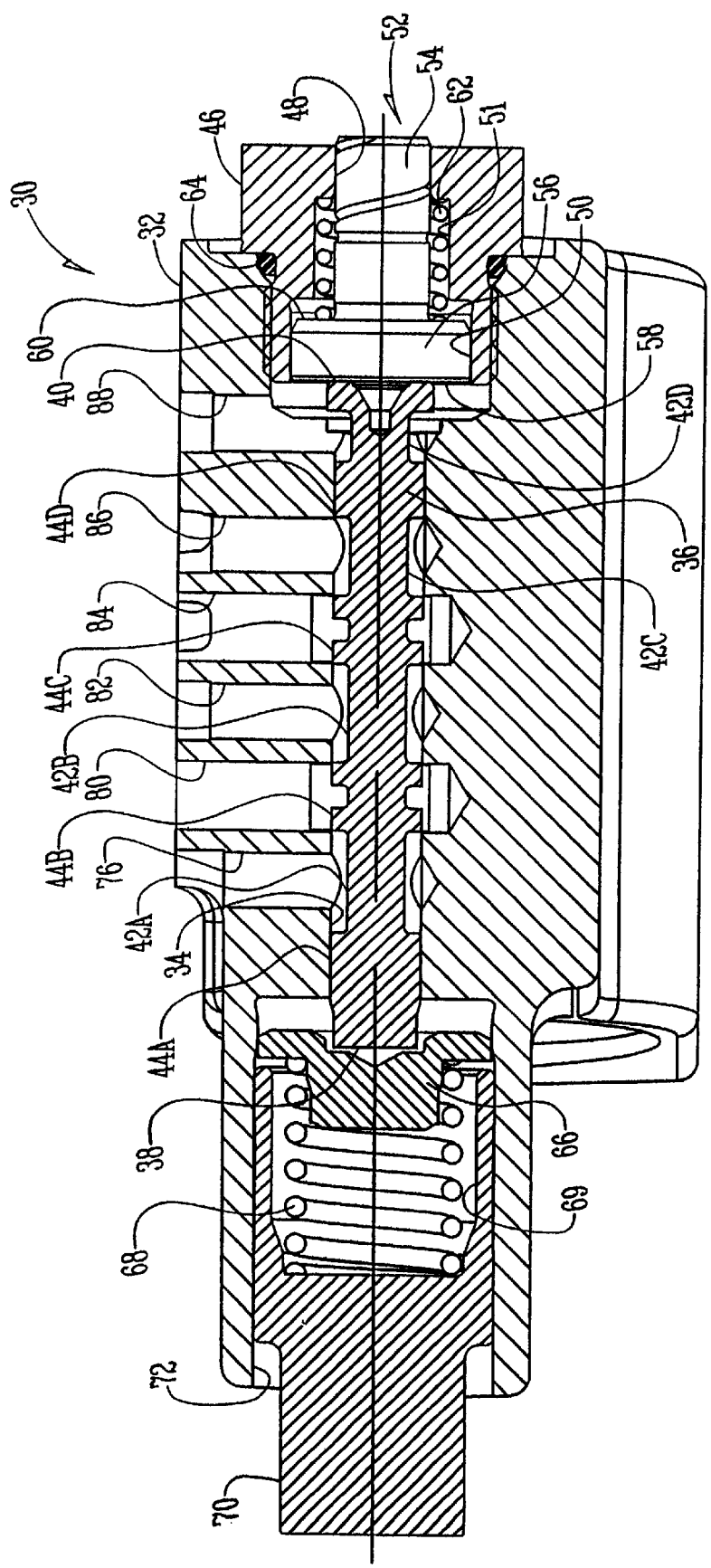
FIG. 2 is a longitudinal cross-sectional view taken along line 2—2 in FIG. 4 of the cold start neutral valve in the cold start position.

The cold start neutral valve 30 of this invention is a three-position valve having at least three ports (or "ways"), and more preferably four ports as shown in FIG. 1. Referring to FIG. 2, the valve 30 includes a valve housing 32 with an elongated spool bore 34 formed therein that houses an elongated cylindrical valve spool 36 for sliding axial movement therewithin. The spool 36 has opposite first and second ends 38, 40, and a plurality of alternating annular grooves 42 and sealing lands 44. The grooves 42 have been individually numbered 42A, 42B, 42C, and 42D. The sealing lands 44 have been individually numbered 44A, 44B, 44C, and 44D for ease of reference. The grooves 42A, 42B, 42C, 42D are axially spaced from each other with the sealing lands 44B, 44C and 44D positioned between them as shown in FIG. 2. The second end 40 of the spool 36 has a predetermined radius and surface area. The radius of the second end 40 of the spool is greater than the radius of the adjacent groove 42D.

Threaded cap 46 seals the end of the spool bore 34 adjacent the second end 40 of the spool 36. The cap 46 has a centralized bore 48 extending therethrough. A first counterbore 50 extends into the inner portion of the cap 46 adjacent the spool 36. A second counterbore 51 occupies the central portion of the cap 46. A plunger 52 extends through the bore 48. The plunger 52 includes a shank portion 54 extending through the bore 48 and an enlarged head portion 54 slidably disposed in the counterbore 50. The head portion 56 has a first surface 58 directed toward the spool 36 and a second surface 60 that is engaged by a spring 62 disposed between the plunger 52 and the cap 46 as shown. An O-ring 64 seals the threaded cap 46 to the housing 32 at the bore 34.

Figure 4:
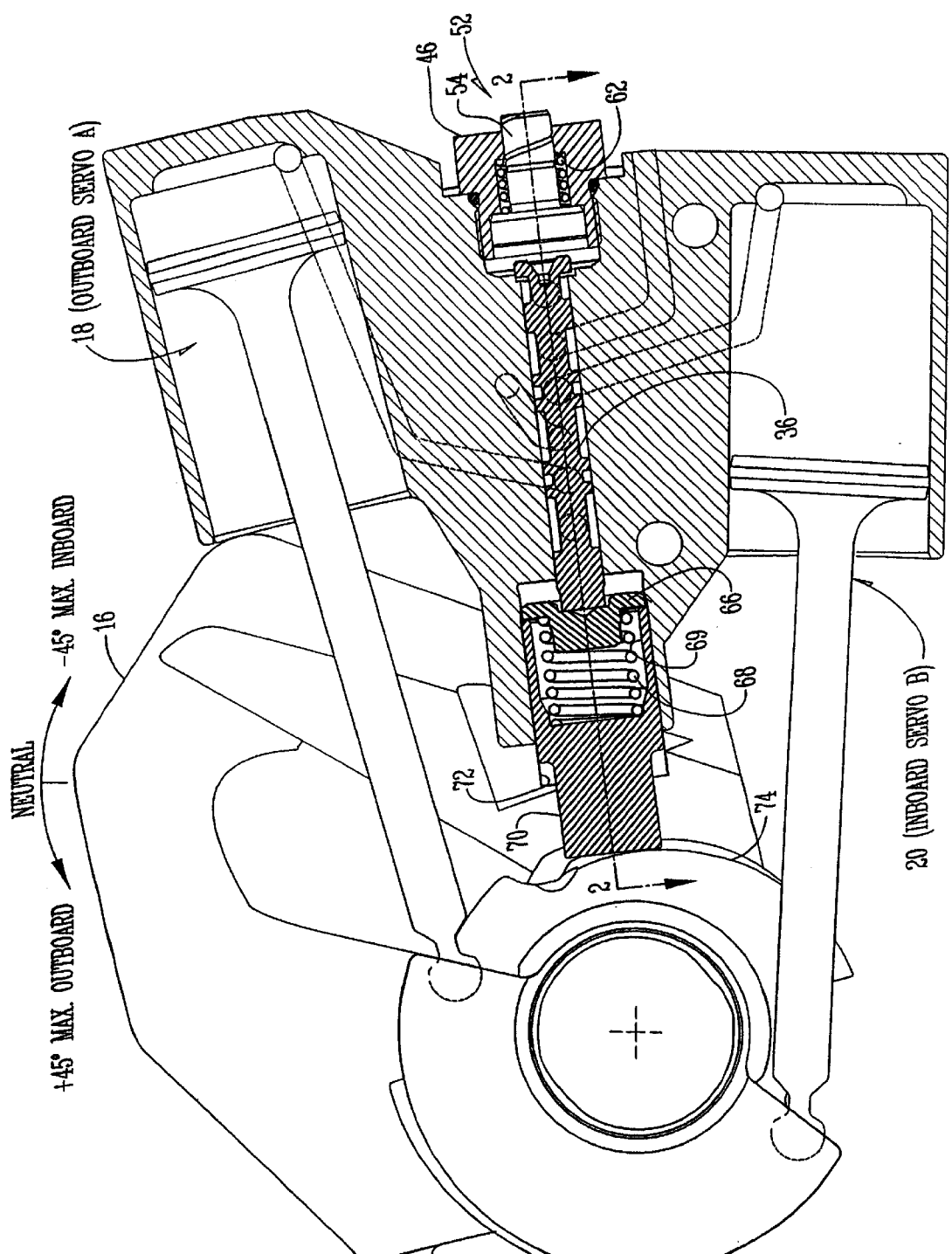
FIG. 4 is a side elevation view of a bent axis hydraulic unit equipped with the valve of FIG. 1. The outer housing has been removed to better show the component parts.

The first end 38 of the spool 36 is operably engaged by a spring seat 66 and a spring 68 positioned between the spring seat 66 and the valve housing 32. As best seen in FIG. 4, the spring 68 resides in a bore 69 formed in one end of a feedback member 70. The feedback member 70 slidably mounts in a bore 72 in the valve housing 32. The feedback member 70 engages a cam 74 attached to the yoke 16. The feedback connection or member 70 is also shown in the schematic of FIG. 1.

The valve housing 32 includes various passages that intersect the spool bore 34 and are axially spaced apart from each other as shown in FIG. 2. The first passage on the left in FIG. 2 is a tank passage 76 that extends to a tank 78 (FIG. 1). The next passage to the right in FIG. 2 is the passage to servo 18, which is also referred to the outboard servo A. The next passage to the right is a control pressure passage 82 connected to a conventional source of control pressure (not shown). The next passage to the right is a servo passage 84, which extends to servo 20 or the inboard servo B. The next passageway to the right in FIG. 2 is a tank passage 86 that communicates with the tank 78. The final passage shown in FIG. 2 is the signal pressure passage 88. The signal passage 88 is in fluid communication with the groove 42D and the first surface 58 of the plunger 52. A source of signal pressure (not shown) is provided. The source of signal pressure is preferably an external source such as a proportional hydraulic valve actuated by an electrical solenoid.

Figure 3:
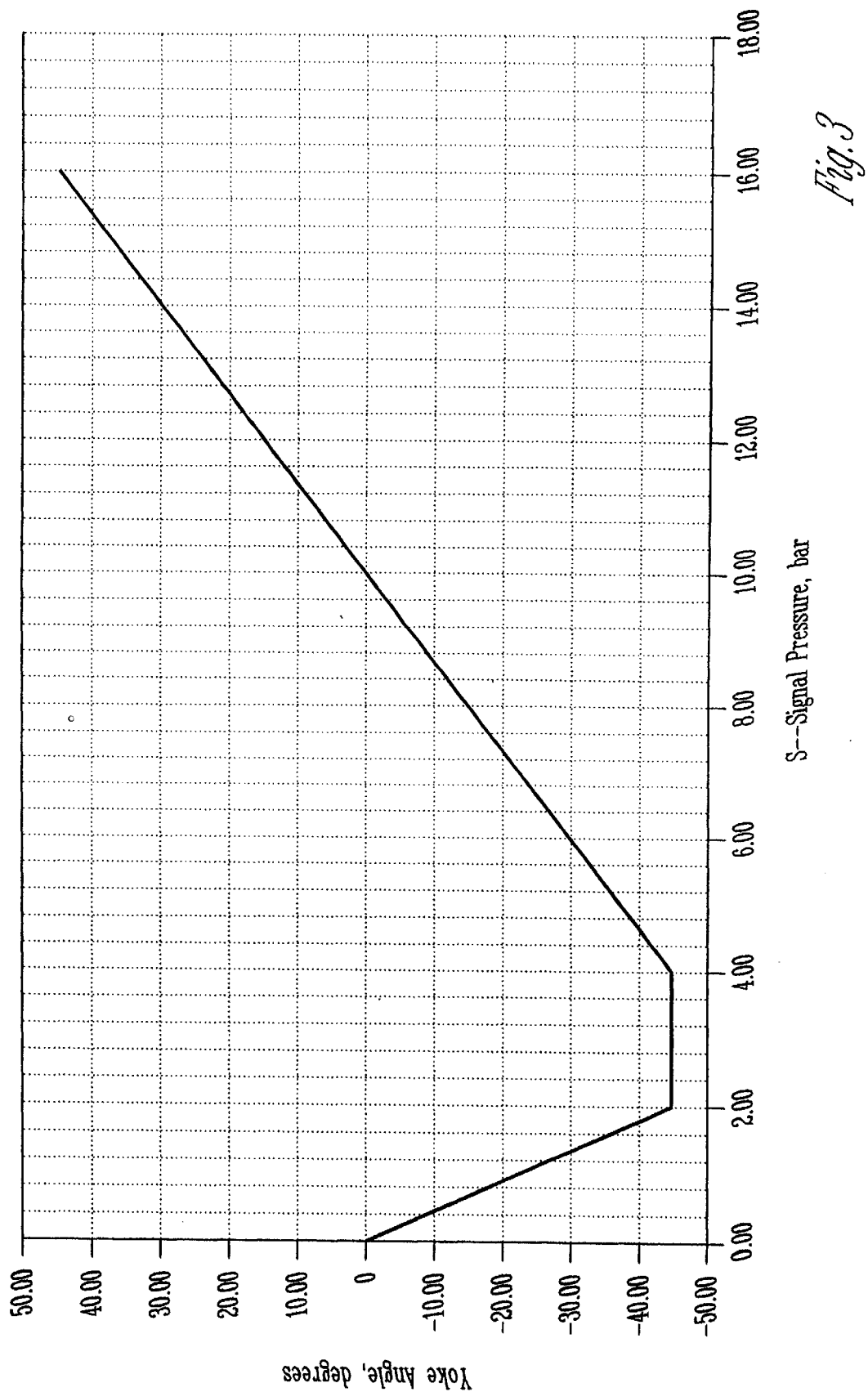
FIG. 3 is a graph of yoke angle versus signal pressure for the cold start neutral valve of FIG. 1.

In operation, the opposing springs 62, 68 mechanically hold the valve 30 in the neutral (cold start) position shown in FIG. 2 in the absence of signal pressure. Referring to FIG. 3, the yoke angle is 0.00 degrees in the neutral position, which is ideal for minimizing the torque required for starting of the engine in cold temperature conditions. Thus, the operator applies no signal pressure to the neutral valve 30 at the instant the engine is started. Until a signal pressure S of a predetermined threshold value is applied to the signal pressure passage 88, the yoke angle decreases to a full stroke position of approximately −45.0 degrees.

However, once the signal pressure S increases to the predetermined threshold value, say 4.0 bar in this example, a number of things begin to happen that cause the yoke angle to be shiftable based upon the signal pressure and feedback from the cam 74 and feedback member 70. As the signal pressure S is increased, it acts upon both the plunger 52 and the spool 36 and urges separation of the second end 40 of the spool 36 and the plunger surface 58. The plunger 52 retracts from the spool 36 and into its cap 46 and does not in any way affect the operation of the control 30 once the signal pressure S exceeds the predetermined threshold pressure. The pressure at which the plunger 52 completely retracts should be lower than the pressure required to operate the control.

For example, the signal pressure can be set to between four and sixteen bar. One bar equals 14.5 lbs/in$^2$ or 100,000 N/meter$^2$. Before four bar and above sixteen bar, the yoke 16 is forced to its mechanical stops. The pressure at which the cold start plunger 52 completely retracts is near three bar, so it does not affect the normal operation of the control.

Figure 2A:
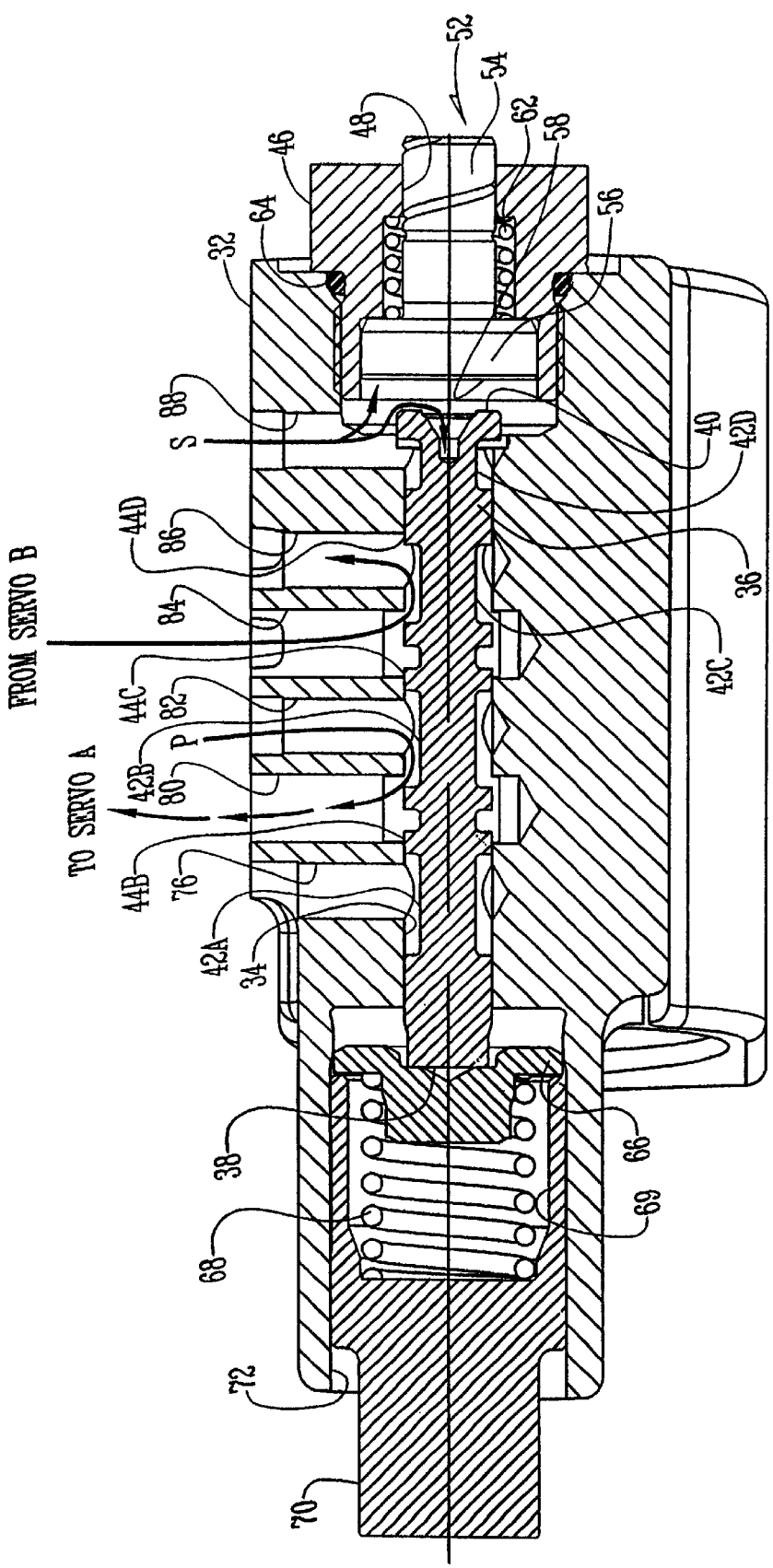
FIG. 2A is a longitudinal cross-sectional view similar to FIG. 2 but shows the valve with the threshold signal pressure applied so as to move the valve spool into a normal operation position.

When the signal pressure S reaches the threshold value, it overcomes the force of spring 62 and pushes the plunger 52 to the right as shown in FIG. 2A. Once the plunger 52 and the spool 36 are separated, the signal pressure S acts on the second end 40 of the valve spool 36 so as to push the spool to the left. This movement allows servo B to port to the tank 78 through passage 86 and control pressure P to pass to servo A through the servo passage 80 and the control pressure passage 82. Thus, the yoke 16 can freely be moved between its full stroke positions of +/−45 degrees yoke angle as the signal pressure S is increased beyond the predetermined threshold value. Based upon the signal pressure S and position of the feedback member 70, the control 30 modulates in this normal operating mode.

When the vehicle is turned off, the signal pressure withdrawn, or the signal pressure decreased to a value less than the threshold pressure, the springs 62, 68 will automatically return the spool 36 to the neutral position shown in FIG. 2. The vehicle will automatically be in the neutral position the next time the vehicle is turned on.

Figure 5:
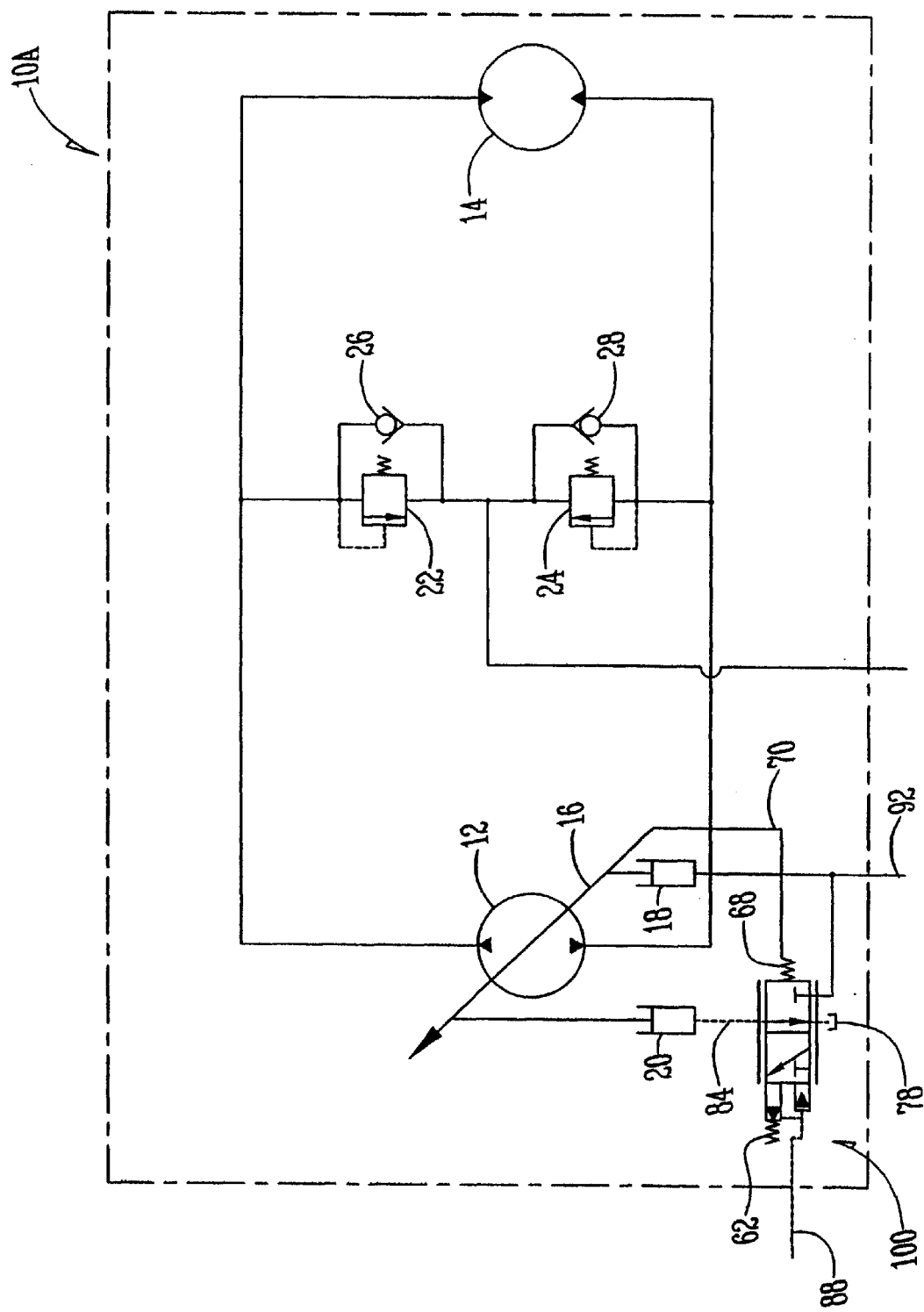
FIG. 5 is a schematic diagram similar to FIG. 1 but shows a second embodiment of the invention in which a two-position, three-way cold start neutral valve is utilized.

The present invention is not limited to the particular three-position, four-way valve configuration shown in FIG. 1. FIG. 5 illustrates that the functional advantages of the present invention can also be achieved in a circuit 10A with a two-position, three-way valve 100. The valve 100 operates in the same manner as the valve 30, but has only one passage leading to a servo, only one passage leading to the tank 78, one passage for control pressure, and one passage for signal pressure. The structure at the ends of the spool 36 remains the same.

Regardless of the embodiment selected, this invention tends to do two things that help position the yoke 16 to a desired angle. The first thing occurs during shut down and the second occurs during start up. As the vehicle is being shut down, the signal pressure S can be reduced to zero and the positioning springs 62, 68 will position the spool 36 and thereby the yoke 16. As the engine is slowing to a stop, any control pressure P remaining will be used to keep the yoke 16 near its desired position. The spool 36 is held mechanically in a correct position with the correct force, without relying on any control pressure. On the other hand, conventional designs typically rely solely on hydraulic signal pressure to position the yoke 16. As the engine is slowing to a stop, this pressure cannot be maintained without the use of an extra device like an accumulator. So, the first function the invention performs is to position the yoke 16 at the correct position during shut down. The yoke 16 then remains near this position so that the torque is reduced during a subsequent start of the vehicle.

The second function of the invention is that it more efficiently overcomes any yoke drift that occurs over time while the vehicle is shut off or if an unexpected shut down of the vehicle occurs. In either case, the yoke 16 may not be in the desired position for a subsequent start up. Mechanically positioning the spool tends to free up oil pressure to position the yoke to the desired angle instead of diverting any oil pressure to position the spool.

The present invention has the unique ability to inactivate or override the function of the valve with the same signal pressure that controls the transmission. Use of the valve provides lower starting torque requirements.

Thus, it can be seen that the present invention is versatile and at least satisfies its stated objectives.

The embodiments shown and described above focus on application of the present invention to a variable displacement bent axis hydraulic pump, but the invention is applicable to variable displacement motors and hydraulic units of non-bent axis designs as well.

What is claimed is:

1. A hydraulic neutral start control valve for a servo-controlled variable displacement hydraulic unit comprising:
   a valve housing having a spool bore therein and a signal pressure passage in fluid communication with the bore;
   a cylindrical valve spool mounted for sliding movement within the spool bore, the spool including opposite first and second ends, the second end of the spool having a predetermined radius and surface area;

a plunger slidably mounted in the spool bore adjacent the second end of the spool, the plunger including a sealing surface thereon disposed in the bore and directed toward the second end of the spool, the sealing surface of the plunger extending radially outward beyond the radius of the second end to define an annular area in fluid communication with the signal pressure passage;

a first positioning spring located between the valve housing and the first end of the spool so as mechanically urge the spool in a first direction axially;

a second positioning spring located between the valve housing and the plunger so as to bias the sealing surface of the plunger into sealing contact with the second end of the spool and thereby mechanically urge the spool in a second direction opposite to the first direction in the absence of a threshold signal pressure;

the plunger and the second end of the spool remaining in sealing contact with each other and the first and second positioning springs maintaining the valve in a closed or neutral position so long as a signal pressure input to the signal pressure passage and thereby to the annular area of the plunger is less than the threshold signal pressure; and the plunger separating from the spool and thereby allowing the signal pressure to hydraulically act on the second end of the spool to operate the valve when the signal pressure applied exceeds the threshold pressure.

2. The valve of claim 1 wherein the valve housing has a control pressure passage, at least one servo pressure passage and at least one tank passage formed therein; the control pressure passage, servo pressure passage and tank passage all intersecting the spool bore and being spaced from the signal pressure passage along a longitudinal axis of the spool bore in a direction toward the first end of the spool.

3. The valve of claim 2 wherein the at least one tank passage includes a pair of tank passages intersecting the spool bore at longitudinally spaced locations and the control pressure passage and the at least one servo passage are located therebetween.

4. The valve of claim 3 wherein the at least one servo passage includes a pair of servo passages such that the neutral start control valve is a three-position four-port valve.

5. The valve of claim 2 wherein the at least one servo passage is a single servo passage and the at least one tank passage is a single tank passage such that the neutral start control valve is a two-position three-port valve.

6. The valve of claim 1 wherein the spool is a single unitary member having a continuous central longitudinal cross section.

7. The valve of claim 1 wherein the spool has a plurality of sealing lands thereon with an annular groove between each of the sealing lands.

8. The valve of claim 1 wherein the first positioning spring is carried by a movable feedback member for sensing the displacement of the variable displacement hydraulic unit.

9. The valve of claim 1 wherein the feedback member is slidably mounted for axial movement in the valve housing and shares a common central longitudinal axis with the valve bore.

10. The valve of claim 1 wherein the signal pressure is variable and in a range of approximately 0–16 bar and the threshold signal pressure is approximately 4 bar.

11. A method of automatically ensuring a neutral condition for cold starts of a signal pressure operated servo-controlled hydraulic unit comprising the steps of:

providing a neutral start valve having a movable valve spool that is mechanically spring biased by a pair of opposing springs to a neutral position corresponding to the neutral condition of the unit in the absence of a signal pressure less than a predetermined threshold value;

applying a force by hydraulic signal pressure against one spring of the pair of opposing springs such that when the signal pressure applied exceeds the threshold value the one spring is separated from the movable spool and movement of the spool is proportional to the signal pressure so long as the signal pressure exceeds the predetermined threshold value; and decreasing the signal pressure below the predetermined threshold value thereby allowing the neutral start valve to mechanically return to the neutral position for subsequent restarts.

* * * * *